UNITED STATES PATENT OFFICE.

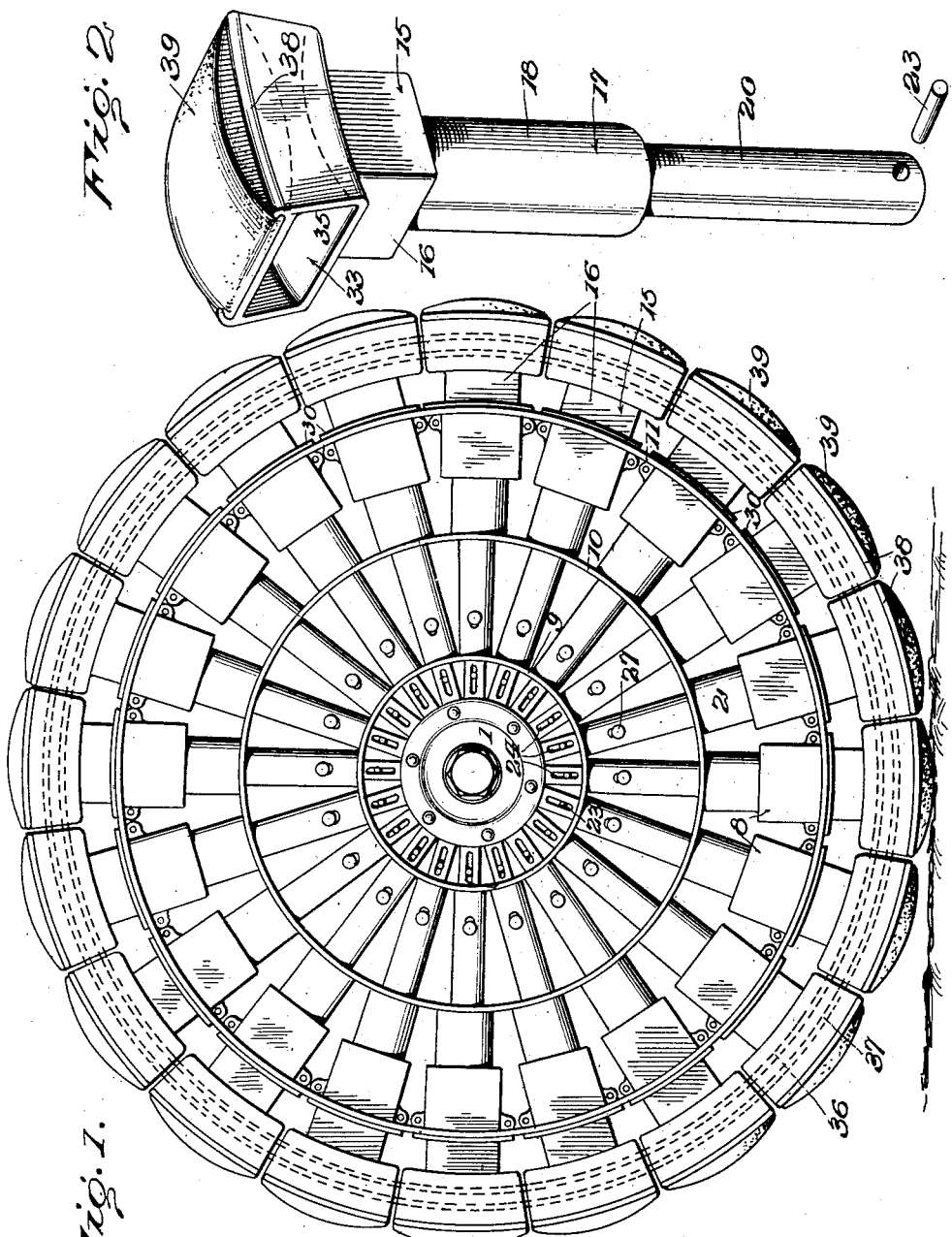

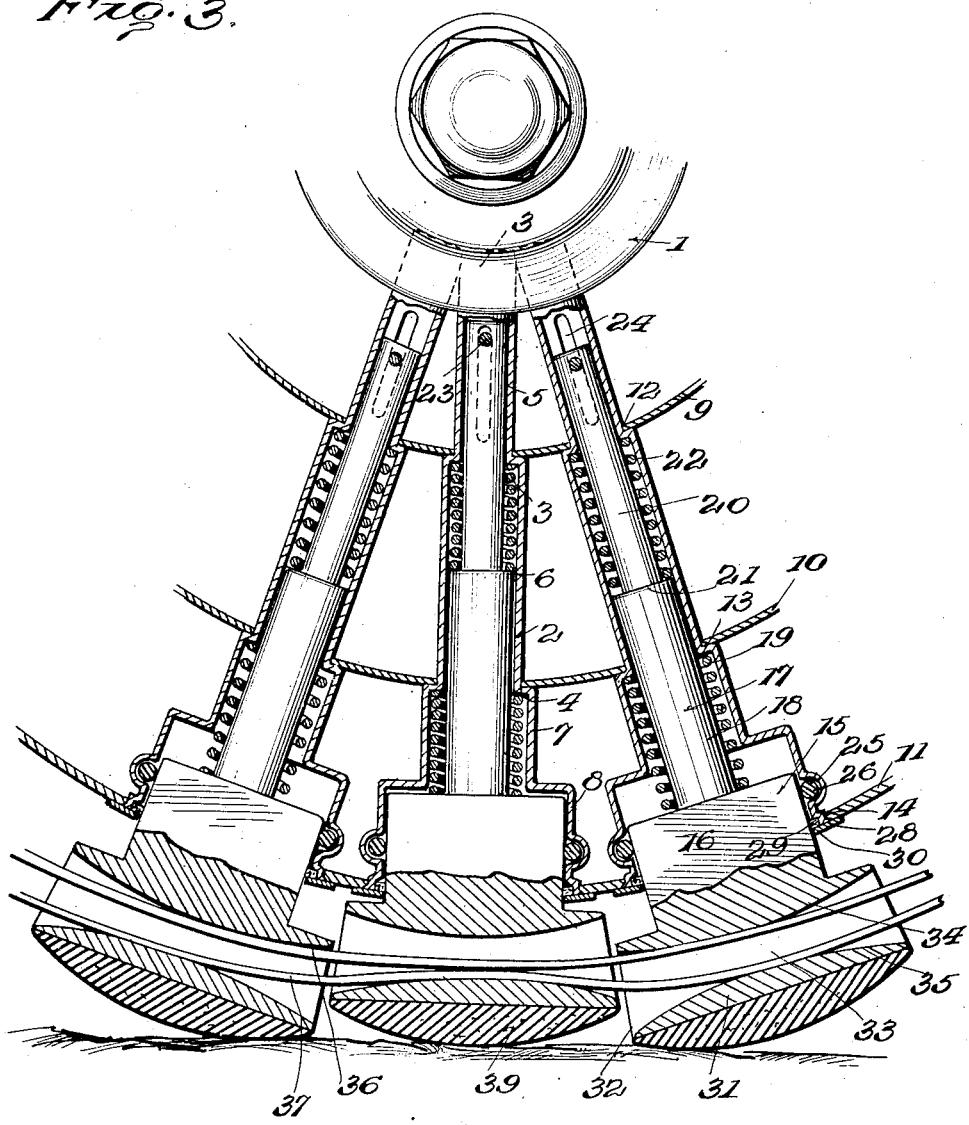

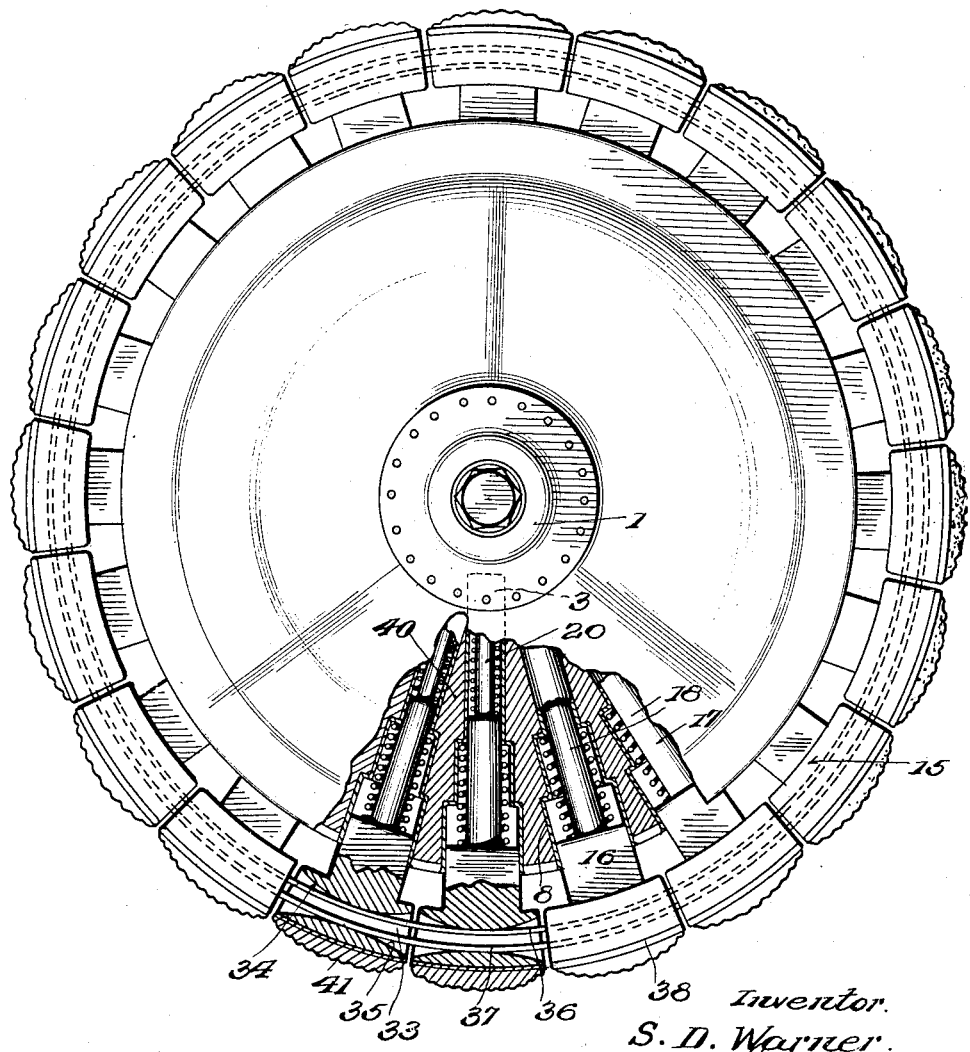

SOTORIOUS D. WARNER, OF KOKOMO, INDIANA.

RESILIENT WHEEL.

1,376,788. Specification of Letters Patent. Patented May 3, 1921.

Application filed March 26, 1919. Serial No. 285,331.

*To all whom it may concern:*

Be it known that I, SOTORIOUS D. WARNER, a citizen of the United States, residing at Kokomo, in the county of Howard and State of Indiana, have invented certain new and useful Improvements in Resilient Wheels, of which the following is a specification.

This invention relates to resilient vehicle wheels and has as its object to provide a resilient wheel which while devoid of pneumatic tires, cushions, and the like liable to puncture, will possess to the fullest degree the resiliency required in such wheels.

Another object of the invention is to provide a wheel of this class which will not be liable to have its parts disarranged or broken in use and which will therefore not require frequent repairs or the renewal of parts.

Another object of the invention is to so construct the wheel that should any of the parts, however, become broken or require repairs or to be replaced, this may be readily done without the necessity of completely disassembling all of the parts of the wheel.

A further object of the invention is to provide a wheel of this class embodying an annular series of radial cushioning devices each independent of the others so that repairs or adjustments may be readily made as concerns any one of the devices without disturbing any of the others.

A still further object of the invention is to provide novel means for yieldably holding the said devices projected and yieldably resisting their inward movement as they pass over the road surface.

A further object is to provide means whereby each of the devices may be independently lubricated so that the devices will work smoothly in the travel of the wheel over the road surface and no disagreeable noises will attend the functioning of the wheels.

Another object of the invention is to provide the said cushioning devices with tread elements of a novel character and to so mount the tread elements that they may be readily replaced when they become worn.

In the accompanying drawings:

Figure 1 is a view in side elevation of one form of wheel constructed in accordance with the present invention;

Fig. 2 is a perspective view of a portion of one of the cushioning devices;

Fig. 3 is a detail vertical sectional view through the lower portion of the wheel illustrating the manner in which the tread devices are to yield as the wheel passes over the road surface;

Fig. 4 is a view similar to Fig. 1 illustrating a slight modification of the invention.

In the drawings, the numeral 1 indicates in general the hub of the wheel which hub may be of any desired construction, either hollow or solid, and adapted in any suitable manner to fit the spindle upon which the wheel is to be mounted.

Each of the cushioning devices heretofore referred to comprises a hollow casing, a plunger working in the casing, and means yieldably resisting the inward movement of the plunger, the plunger being provided at its outer end with a tread head. The casings are indicated in general by the numeral 2 and these casings are arranged in an annular series about the hub 1 and each radial to the said hub, the inner end of each casing being seated or stepped as at 3 in a respective socket formed in the periphery of the hub as shown in Fig. 3 of the drawings. A suitable distance outwardly from the periphery of the hub 1, each casing is increased in diameter thus providing a shoulder 3' both interiorly and exteriorly of the casing, and near its outer end each casing is further increased in diameter to provide another shoulder indicated by the numeral 4. The inner portion of each casing located between the shoulder 3' and the periphery of the hub 1 and indicated by the numeral 5 is therefore of relatively small diameter, the intermediate portion of each casing between the shoulders 3' and 4 and indicated by the numeral 6 is of larger diameter than the portion 5, and, the outer portion of each casing outwardly beyond the shoulder 4 and indicated by the numeral 7 is of larger diameter than the portion 6. Between its portion 7 and its outer extremity, each casing is further increased in diameter and formed preferably of rectangular shape to provide a hollow boxing 8, the construction and purpose of which will be presently more specifically described. As stated, all of the casings are fitted at their inner ends in the respective sockets in the periphery of the hub 1, and in order to properly space and relatively brace all of the casings with relation to one another, concentric annular rim members, indicated respectively by the numerals 9, 10 and 11, are provided and are concentrically arranged with relation to each other and to the hub 1. The rim member 9 is provided at suitable intervals with openings 12 of a diameter to receive the portions 5 of the said casings 2, the outer shoulders 3' bearing against the outer face of the said rim member 9 and these parts being braced or otherwise secured together. The rim 10 is likewise formed of a diameter to receive the portions 6 of the said casings and the outer shoulders 4 engage the outer side or face of the said rim member 10 and these parts are likewise braced or otherwise secured together. Similarly the rim member 11 is formed at intervals with openings 14 which are rectangular and which receive the boxings 8, these boxings being open at their outer ends and being secured at their said ends within the said openings 14 in any desired manner.

Working in each of the casings 2 is a plunger indicated in general by the numeral 15 and this plunger comprises a head, 16 which is rectangular and of dimensions to slidably fit within the respective boxing 8. Each plunger further comprises a shank indicated in general by the numeral 17 and this shank has its outer portion, indicated by the numeral 18, formed of a diameter to slidably and relatively snugly fit within the intermediate portion 6 of the respective casing 2 but of less diameter than the portion 7 of the said casing, a spring 19 being fitted to this portion of the shank and bearing at its inner end against the inner shoulder of the respective casing and at its outer end against the inner side of the head 16 of the said plunger. The inner portion of each shank indicated by the numeral 20, is of less diameter than the portion 18 so that a shoulder 21 is formed between these two portions, the said portion 20 being of a diameter to slidably and yet relatively snugly fit within the portion 5 of the respective casing. A spring 22 is fitted on the portion 20 of the shank and bears at its outer end against the shoulder 21 and at its inner end against the inner shoulder 3' of the casing. These springs 19 and 22, of course, tend to force the respective plunger in an outward direction and in order to limit the movement of each plunger, a pin 23 is fitted diametrically through the inner end of the portion 20 of the plunger and has its ends projecting into slots 24 formed longitudinally in diametrically opposite sides of the portion 5 of the plunger casing.

As stated the head 16 of each plunger is rectangular and fits slidably within the boxing 8 of the respective casing. However, this fit is not a snug one and rollers 25 are mounted in bulged portions 26 in the opposite sides of the boxings 8 and contact the opposite faces of the respective heads 16. Thus the heads of the plungers may move freely inwardly and outwardly in the boxings of the respective casings and yet will be guided in such movement.

It is desirable that each plunger casing be supplied with a suitable quantity of lubricant in order to insure of smooth working of the parts and this lubricant may be introduced through suitable capped filling spouts or openings 27 preferably located in the portion 6 of each casing although these openings may be located in some other portion of each casing if desired. In order to prevent escape of the lubricant due to centrifugal force when the wheel is rapidly rotating in travel, the open outer end of each boxing 8 is formed with a surrounding channel or groove 28 in which is seated a suitable packing ring 29 retained in place by a rectangular cap plate 30 disposed against the outer face of the rim 11 and surrounding the head 16 of the respective plunger 15, these cap plates being secured to the rim in any suitable manner but preferably in a manner which will permit of their removal so that the packing strips 29 may be replaced when required.

The outer portion of each head 16 is somewhat larger than the inner portion thereof and is indicated by the numeral 31, this portion having its ends 32 beveled approximately along lines radial to the axis of the wheel so that the heads may have free sliding movement in a radial direction independently of one another, sufficient space being left between the adjacent ends of adjacent heads to prevent any wedging of the heads when they are moved inwardly. The portion 31 of each head is formed with an opening 33 extending therethrough and opening through the ends 32 of the said head, and each opening 33 has preferably parallel side walls and convex opposed inner and outer walls indicated by the numerals 34 and 35 respectively. Thus each opening 33 is flared in the direction of each end.

While the springs 19 and 22 as before stated serve to yieldably hold the plungers projected outwardly radially, it is preferable to provide additional means for holding the plungers so projected and for yieldably resisting their inward movement, and this means is embodied in inner and outer resilient annular bands 36 and 37 which pass continuously through the openings 33 in the heads of all of the plungers, the band 36 being of a diameter such that it will normally touch the higher points of the walls 34 of all of the openings and the band 37 being of such diameter that it will touch the higher portions of the walls 35 of said openings. Thus the band 36 constitutes a means for resisting the outward thrust of the plungers under the influence of their springs 19 and 22, the walls 34 of the openings in the heads of the plungers receding from contact with the said band when the plungers move inwardly but again striking the band when the plungers are thrust outwardly through the action of their said springs 19 and 22. The band 37, as will be evident by reference to Fig. 3 is adapted to yield inwardly as any one of the plungers is moved radially inwardly as, for example, when its tread comes into contact with the ground surface, the wall 35 of the opening in the head of said plunger bearing constantly against the said band.

The portion 31 of each plunger head is provided at the opposite sides of its outer face with flanges 38 which are designed to clench the edges of a tread member 39 in the nature of a rubber block and which tread member is disposed against the outer face of the said portion 31 of the head, as clearly shown in Figs. 2 and 3 of the drawings. These tread members are preferably of rubber and due to the manner in which they are secured in place, they may be readily renewed when they become worn.

In that form of the invention just described the wheel is of the spoked type but if desired the structure may be modified as shown in Fig. 4 of the drawings in which figure the rims 9 and 10 may be dispensed with and a wooden body 40 may be provided to constitute the web of the wheel, the body being provided with radial recesses or sockets to receive the casings 2 as clearly shown in Fig. 4.

In this modified structure the wheel will, of course, have the appearance of one of the army type and the opposite faces of the wooden web may be suitably finished or the web may have its said faces provided with suitable metallic cap plates if desired.

Also if desired and as shown in the said Fig. 4 the outer faces of the tread members 39 may be corrugated as indicated by the numeral 41 so as to prevent slipping and skidding.

From the foregoing description of the invention it will be seen that I have provided a wheel which while devoid of pneumatic tires or cushions will possess the desired degree of resiliency and will be equally as efficient as a cushioning and shock absorbing means as the ordinary pneumatic tired wheel. It will also be understood that the wheel is simple and substantial in construction and that while repairs will not be often required, they may, when necessary, be made expeditiously and without the necessity of dismantling the entire wheel in order to replace one or more parts.

Having thus described the invention, what is claimed as new is:

1. In a resilient wheel, a plurality of radially movable plungers each having a tread head at its outer end, the heads having openings, and an annular resilient means extending through the openings in the heads and engageable by the opposite walls of the openings in the inward and outward movement of the plungers and cushioning such movement.

2. In a resilient wheel, a plurality of radially movable plungers each having a tread head at its outer end, the heads having openings, and an annular resilient means extending through the openings in the heads and normally contacting the inner walls of all of the openings and yieldably resisting the outward movement of the plunger.

3. In a resilient wheel, a plurality of radially movable plungers each having a tread head at its outer end, the heads having openings, and an annular resilient element extending through the openings in the heads and normally contacting the outer walls of all of the openings.

4. In a resilient wheel, a plurality of radially movable plungers each having a tread head at its outer end, the heads having openings, and inner and outer annular resilient elements extending through the openings.

5. In a resilient wheel, a plurality of radially movable plungers each having a tread head at its outer end, the heads having openings, and inner and outer annular resilient elements extending through the openings and respectively normally contacting the inner and outer walls of the said openings.

6. In a resilient wheel, a plurality of radially movable plungers each having a tread head at its outer end, and resilient means extending through the heads for yieldably resisting inward movement of the plungers.

7. In a resilient wheel, a plurality of radially movable plungers each having a tread head at its outer end, and a single resilient means engaging all of the heads inwardly of their tread faces to yieldably resist inward movement of the plungers.

8. In a resilient wheel, a plurality of radially disposed resiliently movable tread members having alined openings forming a circumferential passage, and spaced concentric circumferential yieldable members disposed in said passage and uniting all of said tread members.

9. In a resilient wheel, a plurality of radial casings forming spokes, a plunger in each spoke, yieldable means resisting inward movement of said plungers, roller bearing members at the outer end of each casing coöperating with said plungers, means for introducing lubricant at the inner end of each casing to be fed centrifugally to the roller bearing members at the outer end thereof, and a lubricant retaining member adjacent the outer end of each casing and beyond the roller bearing members.

In testimony whereof I affix my signature.

SOTORIOUS D. WARNER. [L. S.]